(12) United States Patent
Kolb

(10) Patent No.: US 11,502,381 B2
(45) Date of Patent: Nov. 15, 2022

(54) RECHARGEABLE BATTERY PACK, MACHINING SYSTEM AND METHOD FOR PRODUCING A RECHARGEABLE BATTERY PACK

(71) Applicant: Andreas Stihl AG & Co. KG, Waiblingen (DE)

(72) Inventor: Joachim Kolb, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 112 days.

(21) Appl. No.: 16/870,065

(22) Filed: May 8, 2020

(65) Prior Publication Data

US 2020/0358070 A1    Nov. 12, 2020

(30) Foreign Application Priority Data

May 10, 2019  (EP) ..................... 19173776

(51) Int. Cl.
*H01M 50/543* (2021.01)
*H01M 50/20* (2021.01)
*H01M 50/30* (2021.01)
*H01M 50/271* (2021.01)
*B25F 5/02* (2006.01)
(Continued)

(52) U.S. Cl.
CPC .......... *H01M 50/543* (2021.01); *B25F 5/02* (2013.01); *H01M 50/20* (2021.01); *H01M 50/271* (2021.01); *H01M 50/30* (2021.01); *H01M 50/342* (2021.01); *B23D 57/023* (2013.01); *H01M 2220/30* (2013.01)

(58) Field of Classification Search
CPC ... H01M 50/30; H01M 50/543; H01M 50/342
See application file for complete search history.

(56) References Cited

U.S. PATENT DOCUMENTS

| 3,314,823 | A | * | 4/1967 | Balaguer ................ H01M 6/44 |
| | | | | 429/185 |
| 7,556,656 | B2 | | 7/2009 | Watanabe et al. |
| 10,439,190 | B2 | | 10/2019 | Glauning |

(Continued)

FOREIGN PATENT DOCUMENTS

DE    10 2009 040 128 A1    3/2011
DE    10 2013 211 459 A1    12/2014
(Continued)

*Primary Examiner* — Kenneth J Douyette
(74) *Attorney, Agent, or Firm* — Crowell & Moring LLP

(57) ABSTRACT

A rechargeable battery pack supplies electrical drive power to an electrically driven machining device. The rechargeable battery pack has: a plurality of rechargeable battery cells, wherein the rechargeable battery cells each have cell contacts; a housing, wherein the rechargeable battery cells are arranged within the housing; and a potting compound, wherein the potting compound protects the cell contacts from contact with water from outside the housing. The housing has a housing top part and a housing bottom part. The housing bottom part overlaps the housing top part such that the housing top part defines an outer region and an inner region of the housing bottom part for the potting compound. A casting level of the potting compound in the outer region is above a casting level of the potting compound in the inner region.

14 Claims, 2 Drawing Sheets

(51) Int. Cl.
*H01M 50/342* (2021.01)
*B23D 57/02* (2006.01)

(56) References Cited

U.S. PATENT DOCUMENTS

| | | | | |
|---|---|---|---|---|
| 2009/0092895 A1* | 4/2009 | Yoo | ................ | B29C 45/00 |
| | | | | 425/542 |
| 2009/0258282 A1* | 10/2009 | Harada | ............... | H01M 10/613 |
| | | | | 429/61 |
| 2014/0377622 A1* | 12/2014 | Glauning | .............. | H01M 50/20 |
| | | | | 429/120 |

FOREIGN PATENT DOCUMENTS

| | | |
|---|---|---|
| EP | 3 389 116 A1 | 10/2018 |
| JP | 2012-209135 A | 10/2012 |
| JP | 2015-228286 A | 12/2015 |

* cited by examiner

RECHARGEABLE BATTERY PACK, MACHINING SYSTEM AND METHOD FOR PRODUCING A RECHARGEABLE BATTERY PACK

FIELD OF APPLICATION AND PRIOR ART

The invention relates to a rechargeable battery pack for supplying electrical drive power to an electrically driven machining device, to a machining system having a rechargeable battery pack of this kind and an electrically driven machining device, and to a method for producing a rechargeable battery pack for supplying electrical drive power to an electrically driven machining device.

PROBLEM AND SOLUTION

The invention is based on the problem of providing a rechargeable battery pack for supplying electrical drive power to an electrically driven machining device, a machining system having a rechargeable battery pack of this kind and an electrically driven machining device, and a method for producing a rechargeable battery pack for supplying electrical drive power to an electrically driven machining device, wherein the rechargeable battery pack and the method each have improved properties.

The invention solves the problem by providing a rechargeable battery pack, by providing a machining system, and by providing a method, according to the claimed invention. Advantageous developments and/or refinements of the invention are described and claimed herein.

The rechargeable battery pack according to the invention is designed or configured for, in particular automatically, supplying electrical drive power to an electrically driven machining device, in particular a gardening, forestry and/or construction machining device. The rechargeable battery pack has a plurality of rechargeable battery cells, a housing and a potting compound. The rechargeable battery cells, in particular all of the rechargeable battery cells, each have cell contacts. Furthermore, the rechargeable battery cells, in particular all of the rechargeable battery cells, are arranged within the housing. The potting compound protects, in particular all of, the cell contacts from contact with water, in particular water droplets, from outside the housing. The housing has a housing top part and a housing bottom part. The housing bottom part overlaps or covers the housing top part in such a way that the housing top part defines an outer region and an inner region of the housing bottom part for the potting compound. A casting level or a filling level of the potting compound in the outer region is above a casting level or a filling level of the potting compound in the inner region.

This allows the housing, in particular a point of overlap, point of separation or interface between the housing top part and the housing bottom part, to be potted and, respectively, sealed off and/or sealed, and/or allows the housing top part and the housing bottom part to be mechanically connected to one another. Additionally or alternatively, this allows air to escape from the housing bottom part, in particular the outer region, to the outside, in particular upwards, in a relatively simple manner while feeding the potting compound into the housing, in particular the housing bottom part. Therefore, this allows relatively simple production of the rechargeable battery pack.

In particular, the rechargeable battery cells can be designed for supplying the drive power to the machining device. Additionally or alternatively, the rechargeable battery cells can each be individual rechargeable electrochemical storage elements for electrical energy. In particular, the rechargeable battery cells can be lithium-ion rechargeable battery cells. Further additionally or alternatively, the rechargeable battery cells can be electrically interconnected, in particular connected in parallel or in series. In particular, the cell contacts, in particular in each case, of neighbouring rechargeable battery cells can be electrically connected to one another. Further additionally or alternatively, the rechargeable battery cells can be identical, in particular identical in terms of type and/or construction. Further additionally or alternatively, the cell contacts can be referred to as terminals, poles or connection electrodes. Further additionally or alternatively, the cell contacts can be live, in particular have live surfaces.

The housing, in particular the housing top part and/or the housing bottom part, can protect the cell contacts from contact with water from outside the housing. Additionally or alternatively, before arrangement, the housing top part and the housing bottom part can be separated from one another or the bottom housing part need not or may not overlap the housing top part for the purpose of arranging the rechargeable battery cells within the housing. Further additionally or alternatively, in particular after the arrangement, the housing top part can be arranged above the housing bottom part. Further additionally or alternatively, the housing top part and the housing bottom part can adjoin one another or make contact, in particular in a vertical direction. Further additionally or alternatively, the housing bottom part can overlap the housing top part in a vertical direction and/or on the outside or over the circumference. Further additionally or alternatively, the outer region can be arranged starting from the inner region into the, in particular horizontal, direction to the outside. Further additionally or alternatively, the outer region can be, in particular defined, between an inner side of the housing bottom part and an outer side of the housing top part. In particular, the housing bottom part, by way of the inner side, can be at a distance from the outer side of the housing top part. Further additionally or alternatively, the inner region can be, in particular defined, between inner sides of the housing top part. Further additionally or alternatively, the outer region can have an, in particular closed, annular shape. Further additionally or alternatively, the casting level of the potting compound in the outer region can be closer to an end of the housing top part that is remote from the housing bottom part or is at the top than the casting level of the potting compound in the inner region. Further additionally or alternatively, the casting level of the potting compound in the inner region can be closer to an end of the housing bottom part that is remote from the housing top part or is at the bottom than the casting level of the potting compound in the outer region. Further additionally or alternatively, the housing bottom part can be designed as a mould for the potting compound.

The potting compound can be arranged within the housing bottom part. Additionally or alternatively, the potting compound can be electrically insulating and/or thermally conductive. Further additionally or alternatively, the potting compound can be a casting resin, in particular a synthetic resin. Further additionally or alternatively, the potting compound can be in a solid state.

The rechargeable battery pack, in particular the rechargeable battery cells, can have a maximum electrical drive power of at least 1 kilowatt (kW), in particular of at least 2 kW, and/or of at most 10 kW, in particular of at most 5 kW, in particular of 3 kW. Additionally or alternatively, the rechargeable battery pack, in particular the rechargeable battery cells, can have a rated voltage of at least 10 volts (V), in particular of at least 20 V, and/or of at most 100 V, in particular of at most 50 V, in particular of 36 V. Further additionally or alternatively, the rechargeable battery pack, in particular the rechargeable battery cells, can have a maximum energy content of at least 100 watt-hours (Wh), in particular of at least 200 Wh, and/or of at most 4000 Wh, in particular of at most 2000 Wh, in particular of at most 1000 Wh, in particular of at most 500 Wh, in particular of 337 Wh.

In a development of the invention, the housing, in particular the housing bottom part, has a feed opening. The feed opening is designed or configured for feeding potting compound into the housing, in particular the housing bottom part. Furthermore, the feed opening is in particular arranged below the casting level of the potting compound, in particular in the inner region. This allows the potting compound to be fed or to rise in the housing, in particular the housing bottom part, at least temporarily against the force of gravity or from bottom to top. Therefore, this allows air pockets or bubbles within the potting compound to be reduced or even avoided. In particular, the potting compound can reach as far as the feed opening, in particular downwards.

In one refinement of the invention, the feed opening is arranged on a bottom side, in particular at a bottommost point, of the housing, in particular of the housing bottom part. In particular, the potting compound can reach as far as the bottom side, in particular downwards. Additionally or alternatively, the feed opening can be arranged at an end of the housing bottom part that is remote from the housing top part or is at the bottom.

In one refinement of the invention, the rechargeable battery pack has at least one closure body. The at least one closure body is designed or configured for closing the feed opening, in particular closes the feed opening. This allows flowing of the, in particular liquid, potting compound, in particular after feeding and/or before solidification or curing, out of the housing, in particular the housing bottom part, to be avoided or to be prevented. This allows a subsequent production step to be executed directly after closing, in particular without a waiting time. In particular, the closure body can permanently close the feed opening or remain permanently on the rechargeable battery pack, in particular in the feed opening, or need not or may not be removed from the feed opening.

In one refinement of the invention, the rechargeable battery pack has a feed valve. The feed valve has the feed opening and the at least one closure body. In particular, the feed valve can be a self-closing valve, in particular a diaphragm valve. The diaphragm valve can allow a nozzle to pass through, which nozzle can feed or introduce the potting compound into the housing, in particular the housing bottom part. Additionally or alternatively, the diaphragm valve can automatically close after feeding and removal of the nozzle.

In a development of the invention, the rechargeable battery cells, in particular all of the rechargeable battery cells, each have a gas outlet point, in particular a safety valve. In particular, the gas outlet points, in particular all of the gas outlet points, are in particular arranged, in particular within the housing top part, above the casting level of the potting compound, in particular in the inner region. This allows the gas outlet points to not be able to be enclosed by the potting compound. This allows functioning of the gas outlet points as intended. This allows damage to be kept at a low level, in particular even if the rechargeable battery cells can have a relatively high energy content. In particular, the gas outlet points can, in particular each, allow gas to be discharged from the inside or within the rechargeable battery cell to the outside or outside the rechargeable battery cell, in particular if a gas pressure generated by an electrochemical reaction taking place in or within the rechargeable battery cell can exceed a predetermined limit pressure. Further additionally, one cell contact of a respective one of the rechargeable battery cells can have the gas outlet point.

In a development of the invention, the rechargeable battery cells are in particular arranged completely, in particular within the housing top part, above the casting level of the potting compound, in particular in the inner region. This allows the rechargeable battery cells to not be able to be enclosed by the potting compound.

In a development of the invention, the rechargeable battery cells, in particular all of the rechargeable battery cells, are, in particular elongate, round cells. In particular, an, in particular respective, length of the round cells can be greater than an, in particular respective, diameter of the round cells. Additionally or alternatively, a cell contact of a respective one of the round cells can have the gas outlet point, if present.

Additionally or alternatively, the rechargeable battery cells, in particular all of the rechargeable battery cells, can be pouch cells and the cell contacts, in particular all of the cell contacts, can be cell tabs. In particular, the pouch cells can be flat cells. Additionally or alternatively, the cell tabs can be referred to as contact lugs. Further additionally or alternatively, the cell tabs, in particular all of the cell tabs, can be arranged, in particular completely, within the housing bottom part. Further additionally or alternatively, the cell tabs, in particular all of the cell tabs, can be arranged, in particular completely, below the casting level of the potting compound, in particular in the inner region, and can be enclosed, in particular completely, by the potting compound. Further additionally or alternatively, the pouch cells can have cell casings. The cell casings, in particular all of the cell casings, can be arranged, in particular within the housing top part, above the casting level of the potting compound, in particular in the inner region. Further additionally or alternatively, the potting compound can reach at least as far as the cell casings, in particular all of the cell casings, in particular upwards. Further additionally or alternatively, the cell casings can be partially not enclosed by the potting compound, in particular such that gas can escape from the gas outlet points of the cell casings.

Further additionally or alternatively, the rechargeable battery cells, in particular all of the rechargeable battery cells, can be prismatic cells.

In a development of the invention, the housing top part, in particular a wall of the housing top part, is gas-tight, in particular for at least one solidification or curing period of the potting compound. This allows escape of air from the housing top part to the outside, in particular upwards, while feeding the potting compound into the housing, in particular the housing bottom part, to be avoided or to be prevented. Therefore, this allows rising of the potting compound in the housing top part against the force of gravity or from bottom to top to be avoided or to be prevented. Therefore, this allows the casting level of the potting compound in the inner region to be below the casting level of the potting compound in the outer region. In particular, the wall of the housing upper part can protect the cell contacts from contact with water from outside the housing.

In a development of the invention, an opening of the housing top part faces the housing bottom part.

Additionally or alternatively, an opening of the housing bottom part faces the housing top part.

Additionally or alternatively, the housing top part and the housing bottom part are closed by one another.

In addition or as an alternative, the potting compound in the inner region reaches as far as an end of the housing top part which is adjacent or close to the housing bottom part or is at the bottom, and in particular not up to above this point.

Additionally or alternatively, the potting compound in the outer region reaches up to above an, in particular the, end of the housing top part that is adjacent or close to the housing bottom part or is at the bottom, in particular up to an end of the housing bottom part that is adjacent or close to the housing top part or is at the top.

In particular, the opening of the housing top part can be defined by the wall, in particular an edge of the wall, and/or the adjacent end of the housing top part. In addition or as an alternative, the opening of the housing bottom part can be defined by a wall, in particular an edge of the wall, and/or the adjacent end of the housing bottom part. Further additionally or alternatively, the adjacent end of the housing top part can define the casting level of the potting compound in the inner region. Further additionally or alternatively, the adjacent end of the housing bottom part can define the casting level of the potting compound in the outer region.

In a development of the invention, the potting compound forms, in particular only, one, in particular single, potting block in the outer region and in the inner region. This allows particularly effective potting of the housing, in particular of the point of overlap, point of separation or interface between the housing top part and the housing bottom part, and/or particularly good mechanical connection of the housing top part and the housing bottom part with one another. Additionally or alternatively, this allows the potting compound to be fed in, in particular only, one, in particular single, production step. Therefore, this allows relatively simple production of the rechargeable battery pack.

In a development of the invention, the rechargeable battery pack has a measuring and/or power electronics system. The measuring and/or power electronics system is electrically connected to a plurality of, in particular all of, the cell contacts. Furthermore, the measuring and/or power electronics system is in particular arranged within the housing, in particular the housing bottom part, below the casting level of the potting compound, in particular in the inner region. This allows the measuring and/or power electronics system to be protected against coming into contact with water from outside the housing. In particular, the measuring and/or power electronics system can be, in particular completely, enclosed by the potting compound. Additionally or alternatively, the measuring and/or power electronics system can be live, in particular have live surfaces. In particular, the measuring and/or power electronics system can have at least one printed circuit board. Further additionally or alternatively, the measuring and/or power electronics system can be designed for, in particular automatically, measuring of properties, in particular voltages, of the rechargeable battery cells, in particular all of the rechargeable battery cells. This can allow safety-critical states of the rechargeable battery cells to be detected. Further additionally or alternatively, the measuring and/or power electronics system can be designed for, in particular automatically, controlling, in particular terminating, the output of the electrical drive power from the rechargeable battery pack and/or reception of an electrical charging power by the rechargeable battery pack, in particular depending on the measured properties. This can allow safety-critical states of the rechargeable battery cells and therefore of the rechargeable battery pack to be kept low or even to be entirely avoided.

In a development of the invention, the rechargeable battery pack has a plurality of rechargeable battery pack contacts. The rechargeable battery pack contacts are designed or configured for electrically connecting the rechargeable battery pack and the machining device to one another for supplying electrical drive power from the rechargeable battery pack to the machining device. Furthermore, the rechargeable battery pack contacts, in particular all of the rechargeable battery pack contacts, are arranged below the casting level of the potting compound, in particular in the inner region. This allows a relatively simple and/or compact construction of the rechargeable battery pack. In particular, the rechargeable battery pack contacts can be arranged on the bottom side of the housing, in particular of the housing bottom part. Additionally or alternatively, the rechargeable battery pack contacts can be arranged at an end of the housing bottom part that is remote from the housing top part or is at the bottom. Further additionally or alternatively, the rechargeable battery pack contacts can be live, in particular have live surfaces.

The machining system according to the invention has a, in particular the, rechargeable battery pack as described above and a, in particular the, electrically driven machining device. The rechargeable battery pack and the machining device are designed or configured to be electrically connected to one another for, in particular automatically, supplying electrical drive power from the rechargeable battery pack to the machining device.

In particular, the machining system can be a gardening, forestry and/or construction machining system. Additionally or alternatively, the machining device can be a gardening, forestry and/or construction machining device. Further additionally or alternatively, the machining device can be a manually guided, in particular floor-guided or handheld, machining device. In particular, manually guided, in particular handheld, machining device can mean that the machining device can have a maximum mass of 50 kilograms (kg), in particular of 20 kg, in particular of 10 kg. Further additionally or alternatively, the machining device can have an electric drive motor. Further additionally or alternatively, the rechargeable battery pack and the machining device can be designed to be electrically connected to one another in a detachable manner, in particular without tools and/or without destruction, in particular by means of plug connectors. Further additionally or alternatively, the rechargeable battery pack and the machining device can be designed to be mechanically connected to one another, in particular in a detachable manner, in particular in a detachable manner without tools and/or without destruction. In particular, the machining device can be designed to support the rechargeable battery pack.

In a development of the invention, the machining device has a rechargeable battery receptacle, in particular a rechargeable battery shaft. The rechargeable battery receptacle is designed or configured to receive the rechargeable battery pack.

In a development of the invention, the machining device is a saw, a pole-mounted pruner, a brushcutter, a hedge trimmer, a hedge cutter, a blower device, a leaf blower, a lopper, an angle grinder, a sweeping device, a sweeping roller, a sweeping brush, a lawnmower, a scarifier or a grass trimmer.

The method according to the invention for producing a, in particular the, rechargeable battery pack, in particular as described above, for supplying electrical drive power to a, in particular the, electrically driven machining device comprises the steps of:

a) arranging a, in particular the, plurality of rechargeable battery cells, wherein the rechargeable battery cells each have, in particular the, cell contacts, within a, in particular the, housing, wherein the housing has a, in particular the, housing top part and a, in particular the, housing bottom part, wherein the housing bottom part overlaps the housing top part in such a way that the housing top part defines an, in particular the, outer region and an, in particular the, inner region of the housing bottom part for a, in particular the, potting compound; b) feeding the potting compound in such a way that a, in particular the, casting level of the potting compound in the outer region is above a, in particular the, casting level of the potting compound in the inner region, so that the potting compound protects the cell contacts from contact with water from outside the housing, in particular after step a).

Additionally or alternatively, a) arranging a, in particular the, plurality of rechargeable battery cells, wherein the rechargeable battery cells each have, in particular the, cell contacts, within a, in particular the, housing, wherein the housing has a, in particular the, feed opening, wherein the feed opening is designed for feeding a, in particular the, potting compound into the housing; b) feeding the potting compound at least temporarily against the force of gravity in such a way that the feed opening is below a, in particular the, casting level of the potting compound, so that the potting compound protects the cell contacts from contact with water from outside the housing, in particular after step a).

The method can allow the same advantages as the rechargeable battery pack described above.

In particular, step b) can comprise: feeding the potting compound in a liquid state. Additionally, the method can comprise the step of: curing the potting compound into a solid state, in particular after step b).

BRIEF DESCRIPTION OF THE DRAWINGS

Further advantages and aspects of the invention can be found in the claims and the following description of preferred exemplary embodiments of the invention which are explained below with reference to the figures.

DETAILED DESCRIPTION OF THE EXEMPLARY EMBODIMENTS

Figure 1:
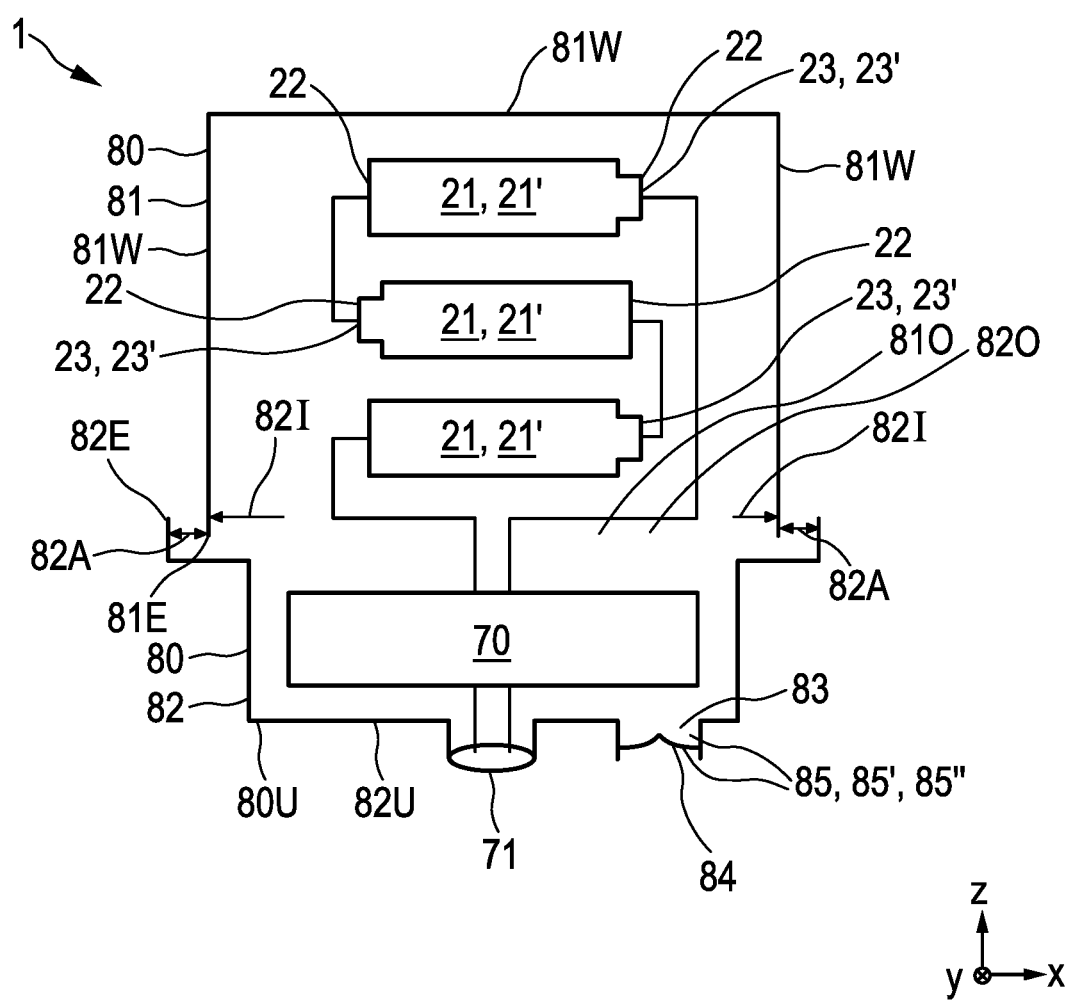
FIG. 1 shows a sectional view through a rechargeable battery pack according to the invention without potting compound and a method according to the invention.
Figure 2:
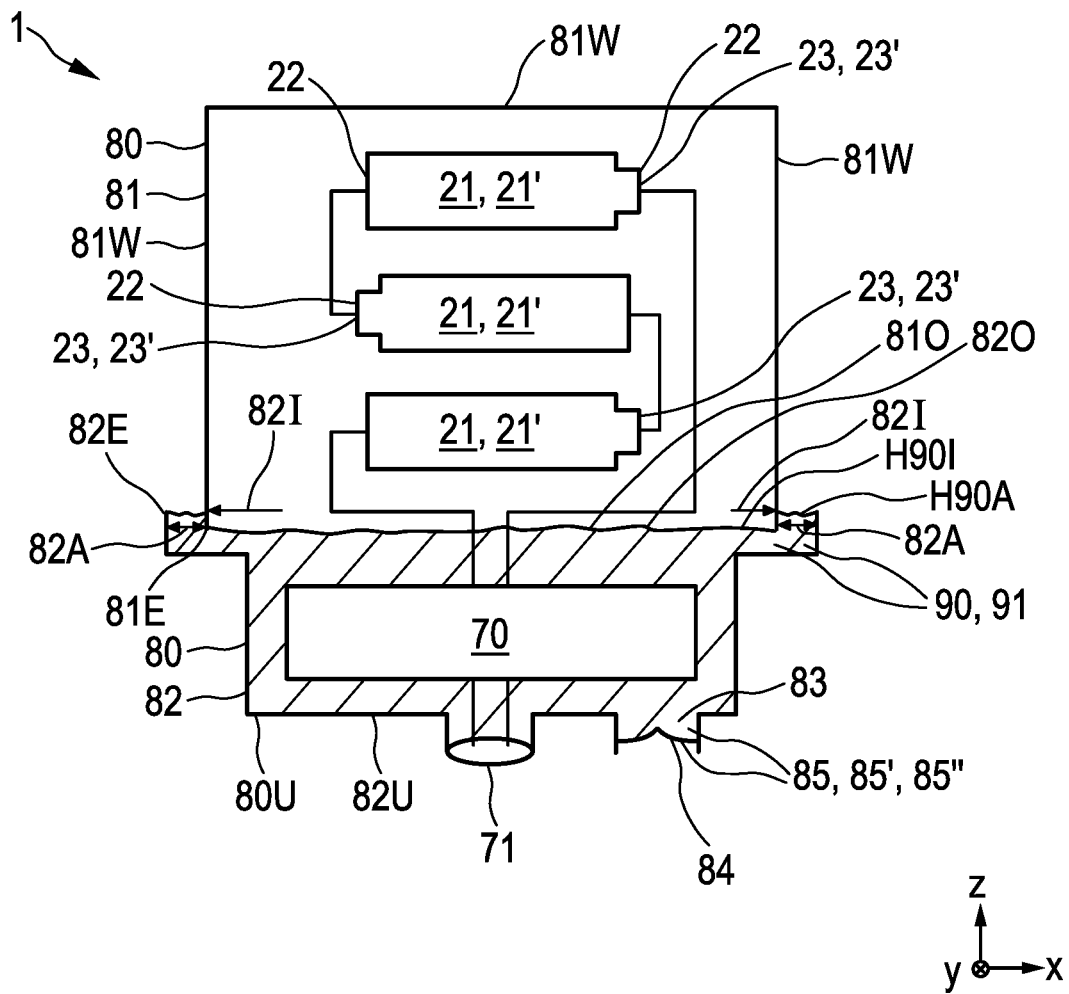
FIG. 2 shows a sectional view through a rechargeable battery pack of FIG. 1 having potting compound and the method according to the invention.
Figure 3:
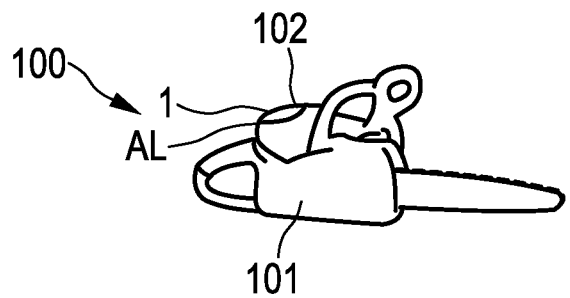
FIG. 3 shows a perspective view of a machining system according to the invention having the rechargeable battery pack of FIG. 1 and an electrically driven machining device in the form of a saw.

FIGS. 1 to 3 show a rechargeable battery pack 1 for supplying electrical drive power AL to an electrically driven machining device 101 and a method for producing the rechargeable battery pack 1 for supplying electrical drive power AL to the electrically driven machining device 101.

The rechargeable battery pack 1 has a plurality of rechargeable battery cells 21, a housing 80 and a potting compound 90. The rechargeable battery cells 21 each have cell contacts 22. Furthermore, the rechargeable battery cells 21 are arranged within the housing 80. The potting compound 90 protects the cell contacts 22 from contact with water from outside the housing 80. The housing 80 has a housing top part 81 and a housing bottom part 82. The housing bottom part 82 overlaps the housing top part 81 in such a way that the housing top part 81 defines an outer region 82A and an inner region 82I of the housing bottom part 82 for the potting compound 90. A casting level H90A of the potting compound 90 in the outer region 82A is above a casting level H90I of the potting compound 90 in the inner region 82I, in particular in a vertical direction z.

The method comprises the steps of:

a) arranging the plurality of rechargeable battery cells 21, wherein the rechargeable battery cells 21 each have the cell contacts 22, within the housing 80, wherein the housing has the housing top part 81 and the housing bottom part 82, wherein the housing bottom part 82 overlaps the housing top part 81 in such a way that the housing top part 81 defines the outer region 82A and the inner region 82I of the housing bottom part 82 for the potting compound 90; b) feeding the potting compound 90 in such a way that the casting level H90A of the potting compound 90 in the outer region 82A is above the casting level H90I of the potting compound 90 in the inner region 82I, so that the potting compound 90 protects the cell contacts 22 from contact with water from outside the housing 80.

Additionally, a) arranging the plurality of rechargeable battery cells 21, wherein the rechargeable battery cells 21 each have the cell contacts 22, within the housing 80, wherein the housing 80 has a feed opening 83, wherein the feed opening 83 is designed for feeding the potting compound 90 into the housing 80; b) feeding the potting compound 90 at least temporarily, the entire time in the exemplary embodiment shown, against the force of gravity in such a way that the feed opening 83 is below the casting level H90I, H90A of the potting compound 90, in particular against the vertical direction z, so that the potting compound 90 protects the cell contacts 22 from contact with water from outside the housing 80.

In the exemplary embodiment shown, the rechargeable battery pack 1 has three rechargeable battery cells 21. In alternative exemplary embodiments, the rechargeable battery pack can have two or at least four rechargeable battery cells.

Furthermore, in the exemplary embodiment shown, the housing 80, in particular the housing top part 81, protects the cell contacts 22 from contact with water from outside the housing 80.

In the exemplary embodiment shown, the potting compound 90 is also electrically insulating.

Furthermore, in the exemplary embodiment shown, the housing top part 81 is arranged above the housing bottom part 82, in particular in the vertical direction z.

In addition, in the exemplary embodiment shown, the outside of the housing bottom part 82 overlaps the inside of the housing top part 81 in the vertical direction z. In particular, the outer region 82A has an, in particular closed, annular shape.

In the exemplary embodiment shown, step b) also comprises: feeding the potting compound 90 in a liquid state. Additionally, the method comprises the step of: curing the potting compound 90 into a solid state.

Therefore, in the exemplary embodiment shown, the housing 80, in particular a point of overlap, point of separation or interface between the housing top part 81 and the housing bottom part 82, is sealed off by the potting compound 90, and the housing top part 81 and the housing bottom part 82 are mechanically connected to one another by the potting compound 90.

Additionally, in the exemplary embodiment shown, air escapes from the housing bottom part 82, in particular the outer region 82A, to the outside, in particular upwards or in the vertical direction z, while feeding the potting compound 90 into the housing 80, in particular the housing bottom part 82.

Specifically, the housing bottom part 82 has the feed opening 83. The feed opening 83 is designed for feeding the potting compound 90 into the housing bottom part 82.

In particular, the feed opening 83 is arranged on a bottom side 80U of the housing 80, in particular on a bottom side 82U of the housing bottom part 82.

The rechargeable battery pack 1 further has at least one closure body 84. The at least one closure body 84 is designed for closing the feed opening 83, in particular closes the feed opening 83.

Specifically, the rechargeable battery pack 1 has a feed valve 85. The feed valve 85 has the feed opening 83 and the at least one closure body 84.

In the exemplary embodiment shown, the feed valve 85 is a self-closing valve 85', in particular a diaphragm valve 85", in particular a cross-slot diaphragm valve.

In addition, the rechargeable battery cells 21 each have a gas outlet point 23, in particular a safety valve 23'. The gas outlet points 23 are in particular arranged, in particular within the housing top part 81, above the casting level H90I, H90A of the potting compound 90, in particular in the inner region 82I, in particular in the vertical direction z.

Therefore, in the exemplary embodiment shown, the gas outlet points 23 are not enclosed by the potting compound 90.

Furthermore, the rechargeable battery cells 21 are completely, in particular within the housing top part 81, above the casting level H90I, H90A of the potting compound 90, in particular in the inner region 82I, in particular in the vertical direction z.

Therefore, in the exemplary embodiment shown, the rechargeable battery cells 21 are not enclosed by the potting compound 90.

The rechargeable battery cells 21 are also, in particular elongate, round cells 21'.

In alternative exemplary embodiments, the rechargeable battery cells can be pouch cells and the cell contacts can be cell tabs.

In the exemplary embodiment shown, a cell contact 22 of a respective one of the round cells 21' has the gas outlet point 23.

In the exemplary embodiment shown, the round cells 21' are further each arranged, by way of a round cell longitudinal axis, in a horizontal direction x which is orthogonal to the vertical direction z.

In addition, in the exemplary embodiment shown, the rechargeable battery cells 21, in particular the round cells 21', are connected in series, in particular in the vertical direction z.

Furthermore, the housing top part 81, in particular a wall 81W of the housing top part 81, is gas-tight.

Therefore, in the exemplary embodiment shown, air cannot escape from the housing top part 81 to the outside, in particular upwards or in the vertical direction z, while feeding the potting compound 90 into the housing 80, in particular the housing bottom part 82.

An opening 81O of the housing top part 81 also faces the housing bottom part 82, in particular downwards.

In addition, an opening 82O of the housing bottom part 82 faces the housing top part 81, in particular upwards.

In addition, the housing top part 81 and the housing bottom part 82 are closed by one another.

In addition, the potting compound 90 in the inner region 82I reaches as far as an end 81E of the housing top part 81 that is adjacent to the housing bottom part 82, in particular upwards or in the vertical direction z.

In addition, the potting compound 90 in the outer region 82A reaches up to above the adjacent end 81E of the housing top part 81, in particular as far as an end 82E of the housing bottom part 82 that is adjacent to the housing top part 81, in particular upwards or in the vertical direction z.

In the exemplary embodiment shown, the housing top part 81 has a bell shape. The opening 81O of the housing top part 81 is a bell-shaped opening.

In the exemplary embodiment shown, the housing bottom part 82 further has a cup shape. The opening 82O of the housing bottom part 82 is a cup-shaped opening.

In addition, in the exemplary embodiment shown, in step b), and in particular during curing, the housing top part 81, by way of the opening 81O, is oriented downwards, in particular such that the potting compound 90 cannot rise in the housing top part 81 against the force of gravity or from bottom to top or in the vertical direction z.

Furthermore, in the exemplary embodiment shown, in step b), and in particular during curing, the housing bottom part 82, by way of the opening 82O, is oriented upwards, in particular such that the potting compound 90 in the liquid state cannot flow out of the housing bottom part 82.

The potting compound 90 also forms a potting block 91 in the outer region 82A and in the inner region 82I.

The rechargeable battery pack 1 further has a measuring and/or power electronics system 70. The measuring and/or power electronics system 70 is electrically connected to a plurality of the cell contacts 22. In addition, the measuring and/or power electronics system 70 within the housing 80, in particular the housing bottom part 82, is below the casting level H90I, H90A of the potting compound 90, in particular against the vertical direction z.

Therefore, in the exemplary embodiment shown, the measuring and/or power electronics system 70 is enclosed by the potting compound 90.

Furthermore, the rechargeable battery pack 1 has a plurality of rechargeable battery pack contacts 71. The rechargeable battery pack contacts 71 are designed for electrically connecting the rechargeable battery pack 1 and the machining device 101 to one another for supplying the electrical drive power AL from the rechargeable battery pack 1 to the machining device 101. The rechargeable battery pack contacts 71 are also arranged below the casting level H90I, H90A of the potting compound 90, in particular against the vertical direction z.

In the exemplary embodiment shown, the rechargeable battery pack contacts 71 are arranged on the bottom side 80U of the housing 80, in particular on the bottom side 82U of the housing bottom part 82.

FIG. 3 shows a machining system 100 according to the invention. The machining system 100 has the rechargeable battery pack 1 and an electrically driven machining device 101. The rechargeable battery pack 1 and the machining device 101 are designed to be electrically connected to one another for supplying electrical drive power AL from the rechargeable battery pack 1 to the machining device 101, in particular are electrically connected.

Specifically, the machining device 101 has a rechargeable battery receptacle 102. The rechargeable battery receptacle 102 is designed for receiving the rechargeable battery pack 1. In particular, the rechargeable battery pack 1 is received.

In FIG. 3, the electrically driven machining device 101 is a saw. In alternative exemplary embodiments, the machining device may be a pole-mounted pruner, a brushcutter, a hedge trimmer, a hedge cutter, a blower device, a leaf blower, a lopper, an angle grinder, a sweeping device, a sweeping roller, a sweeping brush, a lawnmower, a scarifier or a grass trimmer.

As is clear from the exemplary embodiments shown and explained above, the invention provides a rechargeable battery pack for supplying electrical drive power to an electrically driven machining device, a machining system having a rechargeable battery pack of this kind and an electrically driven machining device, and a method for producing a rechargeable battery pack for supplying electrical drive power to an electrically driven machining device, wherein the rechargeable battery pack and the method each have improved properties.

What is claimed is:

1. A rechargeable battery pack for supplying electrical drive power to an electrically driven machining device, comprising:
    a plurality of rechargeable battery cells, wherein the rechargeable battery cells each have cell contacts;
    a housing, wherein the rechargeable battery cells are arranged within the housing; and
    a potting compound, wherein the potting compound protects the cell contacts from contact with water from outside the housing, wherein
    the housing has a housing top part and a housing bottom part,
    the housing top part is arranged above the housing bottom part,
    the housing bottom part overlaps the housing top part such that the housing top part defines an outer region and an inner region of the housing bottom part for the potting compound, and
    a casting level of the potting compound in the outer region is above a casting level of the potting compound in the inner region.

2. The rechargeable battery pack according to claim 1, wherein
    the housing has a feed opening,
    the feed opening is configured for feeding the potting compound into the housing, and
    the feed opening is below the casting level of the potting compound.

3. The rechargeable battery pack according to claim 2, wherein
    the feed opening is arranged on a bottom side of the housing.

4. The rechargeable battery pack according to claim 2, further comprising:
    at least one closure body, wherein the at least one closure body is configured to close the feed opening.

5. The rechargeable battery pack according to claim 4, further comprising:
    a feed valve, wherein the feed valve has the feed opening and the at least one closure body.

6. The rechargeable battery pack according to claim 1, wherein
    the rechargeable battery cells each have a gas outlet point, wherein the gas outlet points of the cells are above the casting level of the potting compound.

7. The rechargeable battery pack according to claim 1, wherein
    the rechargeable battery cells are entirely above the casting level of the potting compound.

8. The rechargeable battery pack according to claim 1, wherein
    the rechargeable battery cells are round cells.

9. The rechargeable battery pack according to claim 1, wherein
    the housing top part is gas-tight.

10. The rechargeable battery pack according to claim 1, wherein at least one of:
    an opening of the housing top part faces the housing bottom part,
    an opening of the housing bottom part faces the housing top part,
    the housing top part and the housing bottom part are closed by one another,
    the potting compound in the inner region reaches as far as an end of the housing top part that is adjacent to the housing bottom part, and
    the potting compound in the outer region reaches up to above an end of the housing top part that is adjacent to the housing bottom part.

11. The rechargeable battery pack according to claim 1, wherein
    the potting compound forms a potting block in the outer region and in the inner region.

12. The rechargeable battery pack according to claim 1, further comprising:
    a measuring and/or power electronics system, wherein
    the measuring and/or power electronics system is electrically connected to a plurality of the cell contacts, and
    the measuring and/or power electronics system is within the housing below the casting level of the potting compound.

13. The rechargeable battery pack according to claim 1, further comprising:
    a plurality of rechargeable battery pack contacts, wherein
    the rechargeable battery pack contacts are configured for electrically connecting the rechargeable battery pack and the machining device to one another for supplying electrical drive power from the rechargeable battery pack to the machining device and are arranged below the casting level of the potting compound.

14. A machining system, comprising:
    rechargeable battery pack according to claim 1; and
    an electrically driven machining device,
    wherein the rechargeable battery pack and the machining device are configured to be electrically connected to one another for supplying electrical drive power from the rechargeable battery pack to the machining device.

* * * * *